United States Patent [19]

Sacht

[11] 4,119,026

[45] Oct. 10, 1978

[54] MACHINE FOR FORMING A ROUND BALE OF FIBROUS AGRICULTURAL MATERIAL

[75] Inventor: Hans Otto Sacht, Wolfenbüttel, Germany

[73] Assignee: Gebrüder Welger, Wolfenbüttel, Germany

[21] Appl. No.: 762,483

[22] Filed: Jan. 26, 1977

Related U.S. Application Data

[62] Division of Ser. No. 612,104, Sep. 9, 1975, Pat. No. 4,009,653.

[30] Foreign Application Priority Data

Sep. 13, 1974 [DE] Fed. Rep. of Germany ....... 2443838

[51] Int. Cl.² .............................................. B30B 3/04
[52] U.S. Cl. ........................................ 100/89; 56/341
[58] Field of Search ................ 100/88, 89, 1, 2, 5, 100/76, DIG. 7; 56/341

[56] References Cited

U.S. PATENT DOCUMENTS

| 1,193,506 | 8/1916 | Brown | 100/89 X |
| 1,881,774 | 10/1932 | MacKenzie | 100/89 X |
| 3,494,281 | 2/1970 | Wannking | 100/89 X |
| 3,899,964 | 8/1975 | Molitorisz | 100/89 |

*Primary Examiner*—Edward J. McCarthy
*Attorney, Agent, or Firm*—Toren, McGeady and Stanger

[57] ABSTRACT

To form round bales of fibrous agricultural material, windrowed material is fed into a baling zone formed within a frame. The frame is formed of a stationary front part and a rear part pivotally connected to the front part. Circumferential peripheral surface of the baling zone is lined with conveying elements, either belts, chains, drums, rollers or the like can be used. The material enters in the lower portion of the front part through an opening between two adjacent conveying elements. As it is carried along by the conveying elements, the material is turned over on itself gradually producing a round bale limited in size by the circumferential periphery of the baling zone. As the zone becomes filled, the conveying elements compress the material, wherein the inner layers foist together in a stellate manner. When the bale is completed the rear part pivots away from the front part to discharge the bale.

9 Claims, 4 Drawing Figures

MACHINE FOR FORMING A ROUND BALE OF FIBROUS AGRICULTURAL MATERIAL

This is a division of application Ser. No. 612,104 filed on Sept. 9, 1975, U.S. Pat. No. 4,009,653.

SUMMARY OF THE INVENTION

The present invention concerns a machine for the production of round bales of fibrous agricultural material, for example of windrowed material and, more particularly, it is directed to a two-piece, generally cylindrical frame or housing with a horizontal center axis, defining a baling zone in which circulating conveying elements, extending over the whole axial width of the housing, are arranged and the conveying elements are driven in the circumferential peripheral direction of the baling zone with an inlet opening formed between two spaced elements.

Various round bale forming machines have been proposed for windrowed fibrous material to which the material has been supplied in a loose, windrow form via a pick-up device to the inlet opening or gap. In the baling zone a lower and an upper conveyor belt are provided, which consist either of individual belts arranged alongside each other with a spacing between them, of straps of material covering the whole width, or of conveying chains with transverse bars. The two conveying belts are arranged and held so that when the baling zone is empty adjacent to the material inlet opening they are opposite each other with a small spacing in one particular section and they carry out oppositely directed movements. The initially introduced, comparatively thin layer of preliminarily compacted material is wound between the two sections in a firm manner to form a roll with a small diameter and the following material is pressed continuously in a tight manner spirally by the radial pressure of the conveyor belts onto the round bale being formed. After reaching the desired diameter the roll bale is tied round several times with binding twine and is thrown out of the baling zone by an upward pivoting movement of a rear part of the housing.

With an increase in the bale diameter the section of one or both of the conveying belts which drives the bale, retracts up to the housing defining the baling zone. The conveying belt lengths, not required initially and afterwards only slowly coming into use, must be taken up by complicated tensioning devices. In accordance with U.S. Pat. No. 3,722,197 the take-up is carried out by means of two tension rolls which are journalled on a pair of hydraulically operated lever arms which form two elongated loops within the empty baling zone.

These tensioning devices are not only complicated and expensive in construction but also constitute a part of the machine which is liable to failure and causes a high degree of wear of the strap and belt material owing to the constant and multiple alternating bending actions. In the above-mentioned patent the direction of bending is changed six times during one cycle of movement of the belt.

The tensioning devices are not capable, as the diameter of the bale increases, of increasing or maintaining constant the pressure on the bale surface. As a result, a bale is formed with a hard core but with an outer part which becomes less and less dense and with its outer layer having the lowest density. A subsequent more substantial compaction of the spiral layers is not possible. The bale has little resistance to weathering on storage in the field and is not likely to retain its shape.

Furthermore, it has been found in the known machines that at the beginning of each bale formation it is not always possible to start the rolling movement of the material since the frictional engagement on the straps and belts is not sufficient in all cases to cause the incoming layer of material to take up its position in the small radius of deflection which brake the flow of material.

A further problem is the need for a uniform supply of material over the axial width of the baling zone. If the baling zone for example owing to an uneven windrow thickness in cross-section, is filled more on one side than on the other this causes not only an unevenness in elongation of the straps and wear of the straps and failure owing to displacement or twisting of individual straps, but also causes the finished bale to have a conical shape, which easily loses the tying twine during transport.

Furthermore, delicate material is strongly compressed and crushed owing to the constant exertion of force on the bale surface even at the beginning of the rolling operation, which leads to a high loss of leaves from the dry leafy material.

If chain conveyors are used as the conveyor belts, the material to be compressed is particularly strongly damaged by the beating effect of the transverse bars. Furthermore, the transverse bars are exposed to high bending moments and the alternating stress occurring under the compressing action of the chain links leads to rapid wear.

Furthermore, machines have been proposed in which only a small part of the circumferential surface of the baling zone for example, the bottom and an adjacent wall, is provided with conveying means so that the material being baled must slide with friction along the greater part of the frame forming the baling zone, if it is to be sent into a rotary movement. Apart from the losses owing to abrasion and stiffness in operation only a loose bundling effect can be achieved.

One object of the present invention is to provide a machine for the production of round bales with a highly compressed density in the outer layers and with a less dense core, whereby the rolling operation is reliably and positively started and then maintained. The construction and drive of the machine is simple. Loose lengths of conveyor belts are avoided at the beginning of the rolling operation and alternate bending stresses on the conveyor belts are also avoided. An even filling over of the entire width of the baling zone is afforded.

Therefore, in accordance with the present invention, a machine is provided for forming round bales of windrowed fibrous material, which includes a two part frame defining a generally cylindrical baling zone with a horizontal center axis. Conveying elements, disposed across the entire width of the baling zone, are supported on the frame and are driven in the peripheral direction of the round bale to be formed. An inlet opening or gap is provided between two of the conveying elements. A distinguishing feature of the invention is characterized in that the conveying elements are fixedly journaled relative to the frame over substantially the whole circumferential periphery of the baling zone. In implementing the invention the material introduced into the baling zone through the inlet opening, after it passes over the lower conveying elements, is deflected by the following conveying elements in an upward direction and by means of the following material is loosely thrown over in the opposite direction so that a loose rolling movement is effected immediately. Since initially no pressure is exerted by the conveying elements on the material, the rolling movement produced by the constant supply of new material is effective independently of frictional engagement, that is, independently of the moisture of the material.

The loose introduction further makes it possible for the material to distribute itself evenly over the entire width of the baling zone as it falls backwardly in the case of uneven windrow width.

It is only when the roll of material has reached the circumferential surface of the baling zone that on further supply of material the conveying means located on the circumferential periphery exerts a pressure directed inwardly so that the inner layers fold together in a stellate manner and become compacted. Accordingly, a round bale is formed with a large compressed density in the outer layers and with a less dense core, which makes possible not only a high resistance to weathering on being stored in the field but also makes possible suitable ventilation both in the storage in the field and in a ventilated plant. Furthermore, the loose core substantially facilitates transport of the ejected bale; it can for example, be picked up by a simple tractor loader by spiking on a prong inserted into the core of the bale so that it can be transported and stacked.

Another advantage is afforded by the possibility of terminating filling at any particular compressed density desired so that the different material conditions and the different requirements as regards the use of the bales can be taken into account.

In one advantageous form of the invention the conveying elements consist either of a number of serially arranged conveyor belts, which make possible a particularly simple and low-wear construction, or of a number of practically service-free conveyor rollers, or, as a further possibility, as a conveyor chain made in one or more parts.

The supply of windrowed material and the discharge of the completed bale are problems which are particularly conveniently solved if, in a conventional manner, the lower conveyor elements form a horizontal conveying bottom surface or one which is inclined downwardly from the inlet opening or gap.

Further, the conveying elements adjacent to the bottom conveying surface are directed upwards so that they make an angle of more than 90° with the conveying bottom. Owing to this arrangement a particularly reliable start of the rolling movement is ensured, for the first incoming material can much more readily follow a conveyor element rising obliquely towards the rear than a conveying element which causes a deflection towards the front at an acute angle with the bottom conveying surface.

A particularly economic construction can be achieved if all the conveyor belts following the belt at the inlet opening have the same dimensions, and more particularly have the same belt lengths.

A reliable transfer of the material from one belt to another and satisfactory rounding off of the bale is obtained if the deflecting roller on the inlet end of each conveyor belt is offset radially outwardly with relation to the central axis of the cylindrical baling zone, in respect to the roller on the discharge end of the preceding conveyor belt.

It is possible to increase the engagement properties of the conveying elements by ensuring that at least some of the conveying straps, belts, rollers or drums are provided on their surface with transversely extending entraining rails or lugs. This advantage is made possible in the case of conveyor belts by constructing them without loop-forming tensioning rollers.

A further increase in the engagement properties of individual conveying rollers or drums can be obtained by the use of conveying tines, which in a conventional manner are eccentrically mounted in the interior of the drums and extend into the conveying zone through openings in the wall of the drums.

In accordance with the invention the two-part frame defining the baling zone has a stationary front part in which the bottom conveying surface and a part of upwardly extending conveying surface are mounted, while the rear part, in which the remaining conveying elements are arranged, is pivotally mounted on the front part so that it can be swung upwards by hydraulic cylinders fixed to the side walls of the frame and attached to the front and rear parts.

The rear part can, in a conventional manner, be mechanically or hydraulically locked in the operating and transport condition with the front part by a locking device secured onto the side walls of the frame. The locking device is coupled with the hydraulic cylinder so that it is released before the rear part can be pivoted to the open position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
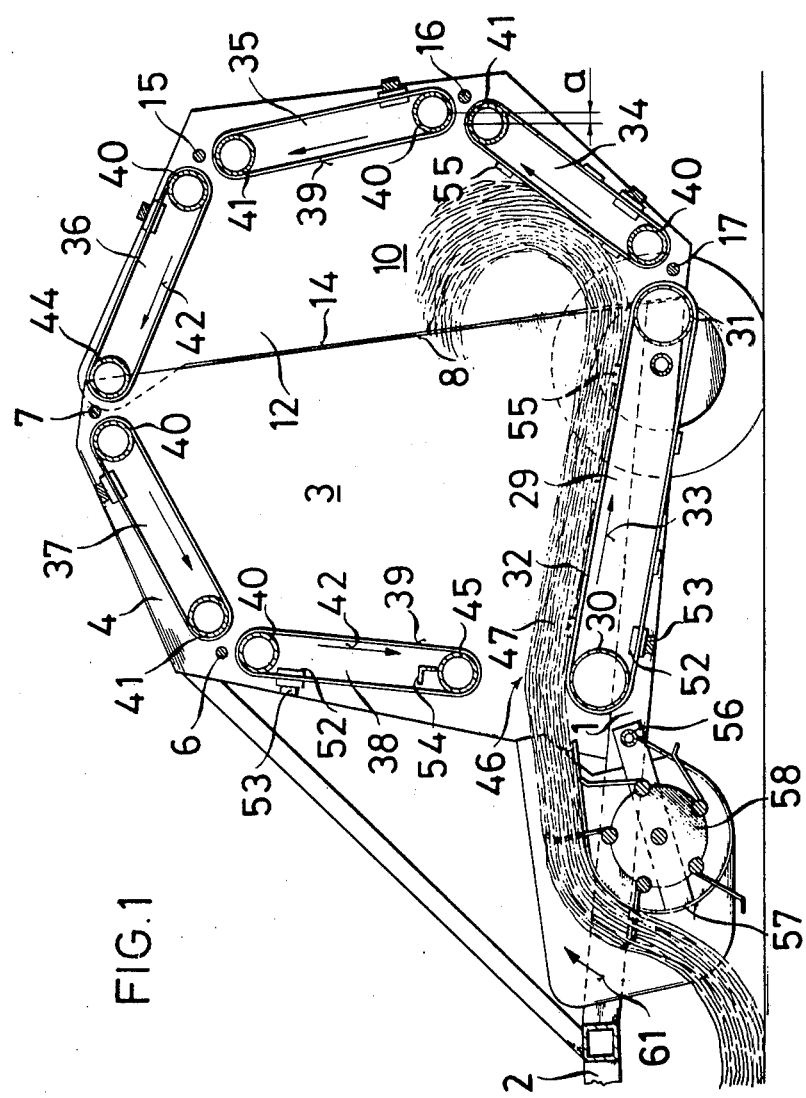
FIG. 1 is a side view partly in section of a machine bale, in accordance with the invention, for forming round bales.
Figure 2:
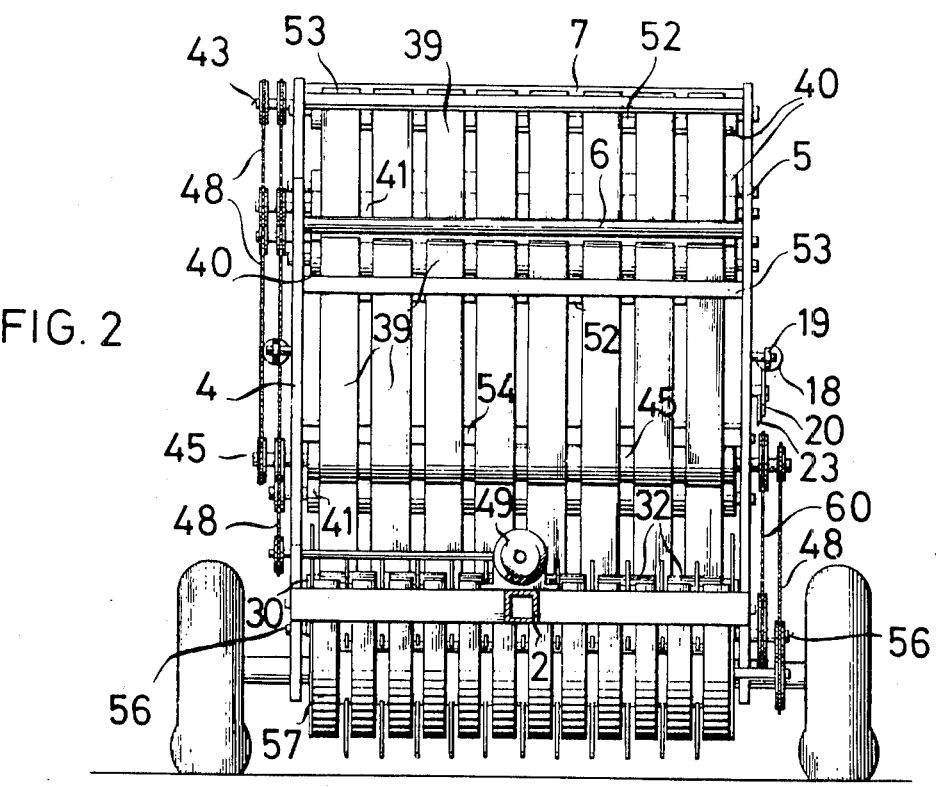
FIG. 2 is a front view of the machine illustrated in FIG. 1.
Figure 3:
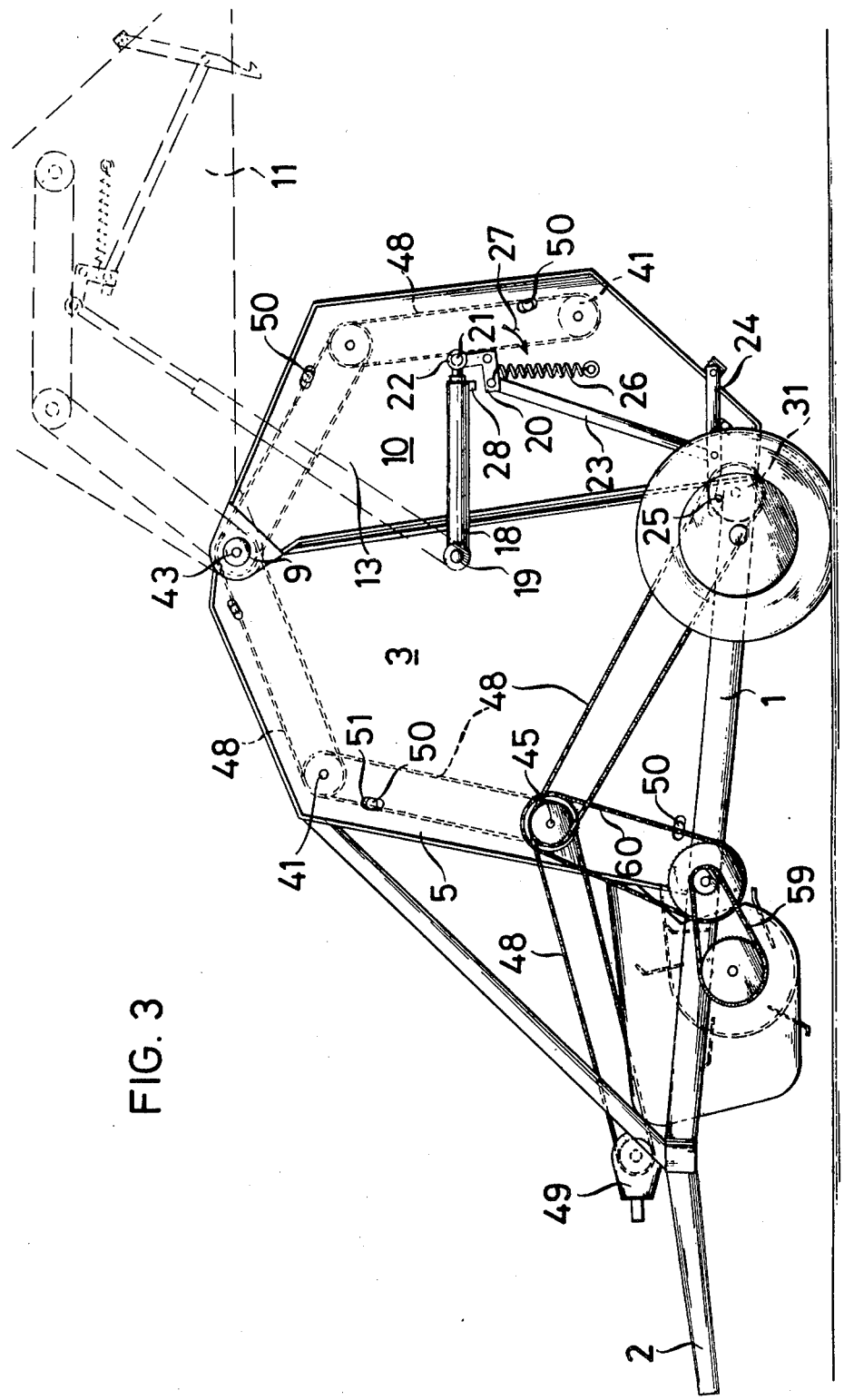
FIG. 3 is a side view from the left in FIG. 2 with the machine shown in the closed position in full lines and in the opened condition in broken lines.

In FIGS. 1, 2 and 3, a machine for forming round bales of windrowed fibrous material is shown consisting of a single axle chassis 1 with a tow-bar 2 extending from a front housing or cage-like frame part 3 which defines a generally cylindrical baling zone. The central axis of the baling zone is horizontal and runs parallel to the axle of the chassis 1. Front part 3 consists of side walls 4 and 5 extending transversely of the central axis and connected together by struts 6 and 7. At the upper end of the rear edge 8 of the side walls 4 and 5 the front part 3 has pivot bearings 9, in which rear part 10 of the baling zone is journalled so that it can be pivoted or swung upwards through approximately 90° into a discharge position 11 shown dotted in FIG. 3. The rear part 10 consists of laterally spaced side walls 12 and 13 which have a front edge 14 juxtaposed, in the closed position, to the rear edge 8 of the front side walls 4 and 5. Side walls 12 and 13 are connected together by struts 15 to 17.

To open the rear housing part 10 a hydraulic cylinder 18 is provided on each of the side walls of the baling zone. The hydraulic cylinders 18 are journalled on a pin 19 on the front side walls 4 and 5. On the side walls 12 and 13 of the rear part 10 a bell crank 20 is pivotally mounted with one leg having a bearing pin 21 to which the piston rod 22 of the cylinder is journalled. The second leg of the bell crank 20 is connected via a coupling rod 23 with a locking hook 24. The locking hook is journalled to the lower section of the rear side walls 12 and 13 and locks the front frame part 3 to the rear frame part 10, by engagement with a pin 25. Tension spring 26 ensures a constant automatic locking action. It is overridden only by actuation of the hydraulic cylinder 18, in which case the bell crank 20 is firstly pivoted in the direction of the arrow 27 up to an abutment 28. In this position the locking action is overcome and the rear part 10 can be pivoted by further actuation of the cylinder 18, into its opened position 11.

A conveying element 29 forms the bottom of the front part 3 and consists of several straps 32 carried over deflecting rollers 30, 31. The straps 32 run from the front or left hand side in FIG. 1, to the back in a downwardly inclined fashion to the horizontal and its movement is denoted by arrow 33.

Above the bottom conveying element 29 the remaining surface or jacket of the generally cylindrical baling zone formed by the front and rear parts 3, 10 consists of five serially arranged independent conveyor belts 34 to 38. All of the conveyor belts 34 to 38 have the same dimensions; they consist of a number of laterally adjacent straps 39, carried over an upstream roller 40, and a downstream roller 41. The straps run in the direction of the arrows 42. The first three conveying belts 34 to 36 following the conveying element 29 are mounted in the rear housing part 10. The next two conveyor belts 37, 38 are supported in the front housing part 3. The conveying belt 34 immediately adjacent to the bottom conveying element 29 is inclined obliquely upwards and at an obtuse angle to the bottom element. The axis 43 of the deflecting roller 44 at the downstream end of the middle conveyor belt 36 runs coaxially to the pivot bearings 9. The last conveyor belt 38 runs practically perpendicularly towards the bottom conveying element 29 and its lower end trained over the deflecting roller 45 is spaced vertically above the front deflecting roller 30 of the bottom conveying element 29 and forms therebetween an inlet opening or gap 46 for the windrow 47 of material to enter into the baling zone.

The deflecting rollers of the conveyor belts 34 to 38 and of the bottom conveying element 29 are supported in the side walls 4, 5, 12 and 13. The deflecting rollers 31, 41, 44 and 45 at the downstream end are driven by chain drives 48 via an angle drive 49 journalled on the chassis 1. The deflecting rollers 30 and 40 at the upstream ends are provided with bearings 50 which can be adjusted in position owing to the provision of slots 51 in the side walls to tighten the rollers. The deflecting roller 40 on the upstream end of each conveyor belt is offset radially outwardly by a distance $a$ in relation to the central axis of the baling zone, from the deflecting rollers 31, 41 and 44 on the downstream end of the preceding conveying belt.

On the rear outer run of the conveying belts between the individual conveying belt straps 32, 39 distance pieces 52 are provided on transverse connecting pieces 53 extending between the side walls of the frame. Furthermore, between the inner and the outer runs stripping connecting pieces 54 are provided, which are attached in an adjustable manner on the side walls. The straps 32 and 39 are partly provided with transverse lugs 55.

On the chassis 1 upstream from the front deflection roller 30 of the bottom conveying element 29, a pick-up device 57 is carried in bearings 56 in a manner allowing vertical swinging movement. The controlled tine drum 58 is driven via chain drives 59 and 60 in the direction of the arrow 61.

Figure 4:
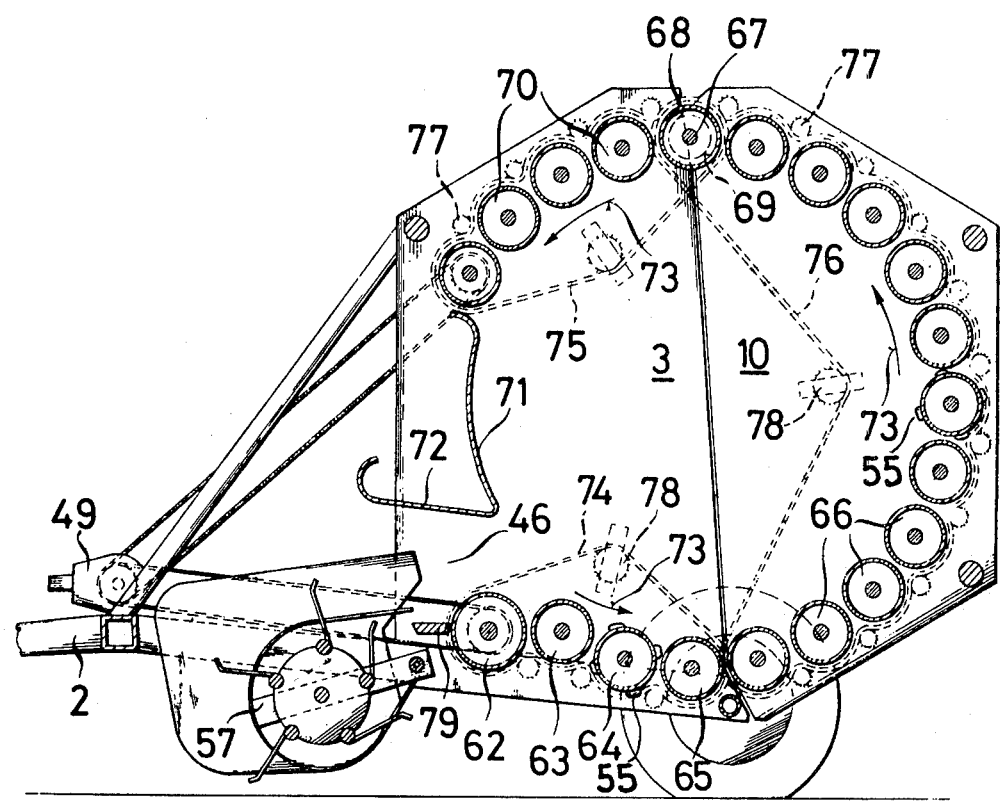
FIG. 4 is a side view similar to FIG. 1, showing another embodiment of the invention.

In the embodiment illustrated in FIG. 4, the conveying belts are replaced by serially arranged conveying drums or rollers which are adjacent to each other. In the front part 3 of the baling zone four conveying drums 62 to 65 form a bottom conveying surface, which is preceded by a pick-up 57 and an intermediate member 79. The bottom conveying surface runs from the inlet opening or gap 46 towards the rear in a downwardly inclined fashion. The rear part 10 is equipped with twelve serially arranged conveying drums or rollers 66 at the circumferential peripheral surface of the generally cylindrical baling zone. Around the shaft 67 of the last conveying drum 68 in the rear part 10, pivot bearings 69 for the rear part are arranged coaxially. Upstream from the last conveying drum or roller 68 the upper circumferential peripheral surface of the front part 3 consists of four conveying drums or rollers 70. The material conveying surface is terminated by a sheet metal guide 71 located above the first drum 62 of the bottom conveying surface. The lower end 72 of the guide 71, defines the upper limit of the inlet opening or gap 46.

All conveying drums or rollers are driven in the direction of the arrows 73. For this purpose at the front part 3, a chain drive 74 is provided for the drums 62 to 65 and a second chain drive 75 is provided for the drums 68, 70. From the conveying drum 68 a further chain drive 76 passes about all of the conveying drums 66 in the rear part 10. The three chains 74 to 76 engage with sprocket wheels of their particular drums, the engagement being ensured by deflecting pinions 77. Each of the chains are tightened by a separate tensioning device 78. The drive is taken from angle or bevel drives 49.

The baling machine described is drawn by a tractor in the field over a window 47, which is taken up by the pick-up 57 and is passed through the inlet gap 46 into the baling zone defined by the front and rear parts 3, 10. The bottom conveying element 29 and, respectively, the rollers 62 to 65 forming the bottom conveying surface in FIG. 4 convey the windrow 47 as far as the adjacent conveying belt 34 and, respectively, as far as the first conveyor drums or roller 66. The material is then carried upwardly and then thrown over by the following part of the windrow pushing it, in a forward direction. On falling over in a forward direction the windrow becomes evenly distributed over the whole width of the baling zone and begins to wind up to form a roll. When the roll has achieved the same size as the baling zone, and additional material enters the baling zone, it is compressed more and more towards the center and the inner layers are folded inwards in a stellate manner. After achieving the desired compressed density of the finished round bale, it is tied up by the introduction of tying twine from a tying device not shown and is then ejected from the machine by opening the rear part 10.

While the specific embodiments of the invention have been shown and described in detail to illustrate the application of the inventive principles, it will be understood that the invention may be embodied otherwise without departing from such principles.

What is claimed is:

1. A machine for forming round bales of windrowed fibrous agricultural material and the like, comprising a cage-like frame having a horizontal central axis defining a generally cylindrically-shaped baling zone, said frame comprising a pair of upwardly extending side walls spaced apart in the horizontal direction, said side walls extending transversely of the horizontal central axis of the baling zone and defining the opposite ends of the baling zone, conveying means extending between said side walls, said conveying means comprising a bottom conveyor member for receiving the agricultural material as it enters the baling zone and a plurality of serially arranged conveying elements for receiving the agricultural material from said bottom conveyor member, and means for driving said conveying means in the direction defining the generally cylindrical circumferential peripheral of the baling zone, wherein the improvement comprises that said conveying elements are fixably journalled to the frame and stationarily mounted on said frame relative to each other during the bale forming operation and are disposed around the generally cylindrical periphery of the baling zone from said bottom conveyor member, the last one of the serially arranged said conveying elements is disposed above said bottom conveyor member in the generally cylindrical peripheral direction of the baling zone and said bottom conveyor member defines the lower side of an inlet opening into the baling zone, and said conveying elements comprise a plurality of conveying rollers arranged in side-by-side relation around the generally cylindrical periphery of the baling zone with the axis thereof disposed in generally parallel relation to the horizontal central axis of the baling zone.

2. A machine, as set forth in claim 1, wherein entraining lugs are attached to said conveying elements and extend across the surface of said conveying elements in generally parallel relation with the central axis of said baling zone so that said lugs entrain the material being baled as said conveying elements move in the cylindrical circumferential peripheral direction of the baling zone.

3. A machine, as set forth in claim 1, wherein said frame comprises a stationary front part and a rear part pivotally connected to said front part on the upper portion of said side walls, so that said rear part can be pivotally displaced from a closed position to an open position, said front part supporting said bottom conveyor member and at least the last one of said conveying rollers, said rear part supporting at least some of the others of said conveying rollers, a separation plane formed between said front and rear part in the closed position and being substantially vertical and extending upwardly through said side walls from the lower to the upper section of said baling zone so that by pivoting said rear part outwardly from said front part a bale of material formed within the baling zone can be removed from the machine.

4. A machine, as set forth in claim 1, wherein a guide extends vertically downwardly from the last one of said conveying rollers toward said bottom conveyor member with the lower side of said guide being spaced vertically upwardly from said bottom conveyer member and forming therebetween the upper and lower sides of the inlet opening into said baling zone.

5. A machine, as set forth in claim 4, wherein said guide being formed of sheet metal.

6. A machine, as set forth in claim 1, wherein said bottom conveyor member comprises at least one second conveying roller, said inlet opening into the baling zone comprising at the lower side thereof said second conveying roller and at the upper side thereof the last one of the serially arranged said conveying rollers comprising said conveying elements.

7. A machine, as set forth in claim 6, wherein said bottom conveyor member comprises said second conveyor roller forming the lower side of said inlet opening and at least another said second conveyor roller, said second conveying rollers extending inwardly into the baling zone in the direction of movement of the material from the inlet opening into the baling zone for introducing the fibrous material therein to said conveying elements.

8. A machine, as set forth in claim 3, wherein a releaseable lock is provided between said front part and said rear part for retaining said front and rear parts locked together.

9. A machine, as set forth in claim 8, wherein means are mounted on the outer surfaces of said side walls for pivotally displacing said rear part relative to said front part.

* * * * *